Patented July 1, 1924.

1,500,060

UNITED STATES PATENT OFFICE.

ANTOINE REGNOUF DE VAINS, OF MIRIBEL, AIN, FRANCE.

CONTINUOUS CHLORINATION OF LIGNO- AND PECTO-CELLULOSE BY NASCENT CHLORINE FOR THE PURPOSE OF OBTAINING PURE CELLULOSE.

No Drawing.     Application filed December 11, 1922. Serial No. 606,293.

*To all whom it may concern:*

Be it known that I, ANTOINE REGNOUF DE VAINS, citizen of the Republic of France, residing at 10 rue Henri Grosbon, Miribel, Ain, France, have invented new and useful Improvements in Continuous Chlorination of Ligno- and Pecto-Cellulose by Nascent Chlorine for the Purpose of Obtaining Pure Cellulose, of which the following is a specification.

U. S. Patent No. 1,106,994 dated August 11th 1914 relates to the chlorination of ligno- and pecto-cellulose by means of hydrochlorate.

The same reaction can be effected by nascent chlorine and this feature forms the subject of the present invention.

According to the present invention, chlorination is effected by mixing with the pulp a small quantity of hydrochloric acid and by distributing a solution of any known hypochlorite through said acidulated pulp. The form of the reaction is as follows; taking as prototype the application of calcium hypochlorite and hydrochloric acid, for instance: $CaOCl_2 + 2HCl = CaCl_2 + 2Cl + H_2O$.

The chlorine acts in the nascent state and combines with the ketones or other organic radicals so as to chlorinate them, thereby forming hydrochloric acid which re-enters the cycle of the reaction.

When carrying out the invention, the cellulosic semi-pulp, diluted in water at any desired density is sent in a continuous stream into a closed mixing device. Dilute hydrochloric acid and alkali metal hypochlorite, or hypochlorite of the alkaline earths, also in solution, are then introduced by the same nozzle as is utilized for the introduction of the pulp into the apparatus. The pulp and the reagents entering continuously into the chlorinating apparatus act one upon the other in accordance with the formula explained above and produce, on the one hand, products which are cellulosic and chlorinated, or more or less oxidized by the action of the nascent chlorine, and on the other hand, the corresponding metallic chloride.

The present invention consists in causing the chlorine to act in the nascent state, however it may have been obtained. In particular the nascent chlorine may be obtained by the reaction of an alkali metal hypochlorite or of a hypochlorite of the alkaline earths upon a mineral or organic acid capable of separating chlorine from its compounds. The term "alkali metal hypochlorite" used in the claim is intended to cover both alkali metal hypochlorite and the alkali earth metal hypochlorites.

I claim:

A process for the chlorination of non-cellulosic compounds of a ligneous material consisting in adding a quantity of hydrochloric acid to a pulp and then mixing a solution of an alkali metal hypochlorite with said acidulated pulp.

ANTOINE REGNOUF DE VAINS.